United States Patent
Diab et al.

(10) Patent No.: US 9,219,651 B2
(45) Date of Patent: *Dec. 22, 2015

(54) METHOD AND SYSTEM FOR DYNAMICALLY DETERMINING WHEN TO TRAIN ETHERNET LINK PARTNERS TO SUPPORT ENERGY EFFICIENT ETHERNET NETWORKS

(71) Applicant: Broadcom Corporation, Irvine, CA (US)

(72) Inventors: Wael William Diab, San Francisco, CA (US); Scott Powell, Alisa Viejo, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,617

(22) Filed: Dec. 10, 2013

(65) Prior Publication Data

US 2014/0098826 A1 Apr. 10, 2014

Related U.S. Application Data

(63) Continuation of application No. 12/195,199, filed on Aug. 20, 2008, now Pat. No. 8,615,018, which is a continuation-in-part of application No. 11/859,429, filed on Sep. 21, 2007, now Pat. No. 8,218,567.

(Continued)

(51) Int. Cl.
*H04J 3/16* (2006.01)
*H04L 12/24* (2006.01)
(Continued)

(52) U.S. Cl.
CPC .............. *H04L 41/0833* (2013.01); *H04B 3/32* (2013.01); *H04L 5/0007* (2013.01); *H04L 12/12* (2013.01);
(Continued)

(58) Field of Classification Search
CPC ........................ H04L 56/40136; H04L 56/12
USPC ........................................................ 370/437
See application file for complete search history.

(56) References Cited

U.S. PATENT DOCUMENTS 6,477,200 B1 11/2002 Agazzi et al.
6,591,303 B1 7/2003 Hendel et al.
(Continued)

FOREIGN PATENT DOCUMENTS

CN 1700693 11/2005

OTHER PUBLICATIONS

European Search Report for European Patent Application No. 09008289.2-1244, dated Feb. 4, 2010.
TW Office Action, Jun. 24, 2013.
TW Re-Examination, Oct. 31, 2013.

*Primary Examiner* — Mark Rinehart
*Assistant Examiner* — Matthew Hopkins
(74) *Attorney, Agent, or Firm* — Foley & Lardner LLP; Christopher J. McKenna; Paul M. H. Pua

(57) ABSTRACT

Training, refreshing and/or updating Ethernet link partners for silent channels and/or silent directions of channels may be determined based on control parameters. This may be used to improve energy efficiency in Ethernet communication. Control parameters may comprise a default value and/or may be determined based on prior training, refreshing and/or updating. New values for the control parameters may be generated based on a magnitude of change between current and prior control parameter values or based on performance such as bit error rate. User input may be utilized to determine when to execute the training, refreshing and/or updating. The training, refreshing and/or updating may be done for one or more of a near-end crosstalk canceller, alien near-end crosstalk canceller, far-end crosstalk canceller, alien far-end crosstalk canceller and echo canceller. After the training, refreshing and/or updating, the silent channels may transition to active and/or may remain silent.

18 Claims, 5 Drawing Sheets

Related U.S. Application Data

(60) Provisional application No. 60/917,870, filed on May 14, 2007, provisional application No. 60/894,240, filed on Mar. 12, 2007, provisional application No. 60/979,433, filed on Oct. 12, 2007, provisional application No. 60/078,999, filed on Jul. 8, 2008.

(51) Int. Cl.
    *H04B 3/32* (2006.01)
    *H04L 12/12* (2006.01)
    *H04L 12/40* (2006.01)
    *H04L 12/413* (2006.01)
    *H04L 5/00* (2006.01)

(52) U.S. Cl.
    CPC ........ H04L 12/40136 (2013.01); H04L 12/413 (2013.01); *Y02B 60/31* (2013.01); *Y02B 60/34* (2013.01); *Y02B 60/35* (2013.01)

(56) References Cited

U.S. PATENT DOCUMENTS

| | | |
|---|---|---|
| 6,795,450 B1 * | 9/2004 | Mills et al. .................... 370/463 |
| 7,358,745 B1 | 4/2008 | Lo et al. |
| 2003/0179711 A1 | 9/2003 | Huff |
| 2004/0001450 A1 * | 1/2004 | He et al. ....................... 370/286 |
| 2004/0223462 A1 | 11/2004 | Cromer et al. |
| 2005/0030808 A1 * | 2/2005 | Brown et al. ................. 365/222 |
| 2006/0034295 A1 | 2/2006 | Cherukuri et al. |
| 2006/0153238 A1 * | 7/2006 | Bar-On et al. ................ 370/473 |
| 2007/0274348 A1 * | 11/2007 | Friedman et al. ............. 370/503 |
| 2007/0280239 A1 | 12/2007 | Lund |
| 2008/0225881 A1 | 9/2008 | Powell |
| 2009/0097390 A1 | 4/2009 | Diab et al. |
| 2009/0097392 A1 | 4/2009 | Diab et al. |
| 2009/0125735 A1 | 5/2009 | Zimmerman |
| 2009/0316718 A1 * | 12/2009 | Traeber ........................ 370/463 |
| 2011/0249686 A1 * | 10/2011 | Langner et al. ............... 370/465 |

\* cited by examiner

▨ Active at full rate in first direction, silent in second direction
▥ Active at full rate in first direction, training in the second direction
TP = Training parameters

METHOD AND SYSTEM FOR DYNAMICALLY DETERMINING WHEN TO TRAIN ETHERNET LINK PARTNERS TO SUPPORT ENERGY EFFICIENT ETHERNET NETWORKS

CROSS-REFERENCE TO RELATED APPLICATIONS/INCORPORATION BY REFERENCE

This application is a continuation of U.S. Non-Provisional Application Ser. No. 12/195,199, filed Aug. 20, 2008, which makes reference to and claims priority to U.S. Provisional Application Ser. No. 60/979,433, filed on Oct. 12, 2007, and U.S. Provisional Application Ser. No. 61/078,999, filed Jul. 8, 2008. U.S. Non-Provisional Application Ser. No. 12/195,199 is a continuation-in-part of U.S. Non-Provisional Application Ser. No. 11/859,429 (Now U.S. Pat. No. 8,218,567), filed Sep. 21, 2007, which makes reference to and claims priority to U.S. Provisional Application Ser. No. 60/894,240, filed Mar. 12, 2007, and U.S. Provisional Application Ser. No. 60/917,870, filed May 14, 2007. Each of the above-identified applications is hereby incorporated herein by reference in its entirety.

FIELD OF THE INVENTION

Certain embodiments of the invention relate to networking. More specifically, certain embodiments of the invention relate to a method and system for dynamically determining when to train Ethernet link partners to support energy efficient Ethernet networks.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often result in significant increases in power consumption.

New transmission technologies enable higher transmission rates over copper cabling infrastructures. Various efforts exist in this regard, including technologies that enable transmission rates that may even reach 100 Gigabit-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. Non-standard transmission rates comprise 2.5 Gbps as well as 5 Gbps.

The specification for 10 Gigabit-per-second (Gbps) Ethernet transmissions over twisted-pair cabling (10GBASE-T) is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. New IEEE cabling specifications are being considered for 40 Gbps and 100 Gbps rates.

Further limitations and disadvantages of conventional and traditional approaches will become apparent to one of skill in the art, through comparison of such systems with the present invention as set forth in the remainder of the present application with reference to the drawings.

DETAILED DESCRIPTION OF THE INVENTION

Figure 1:
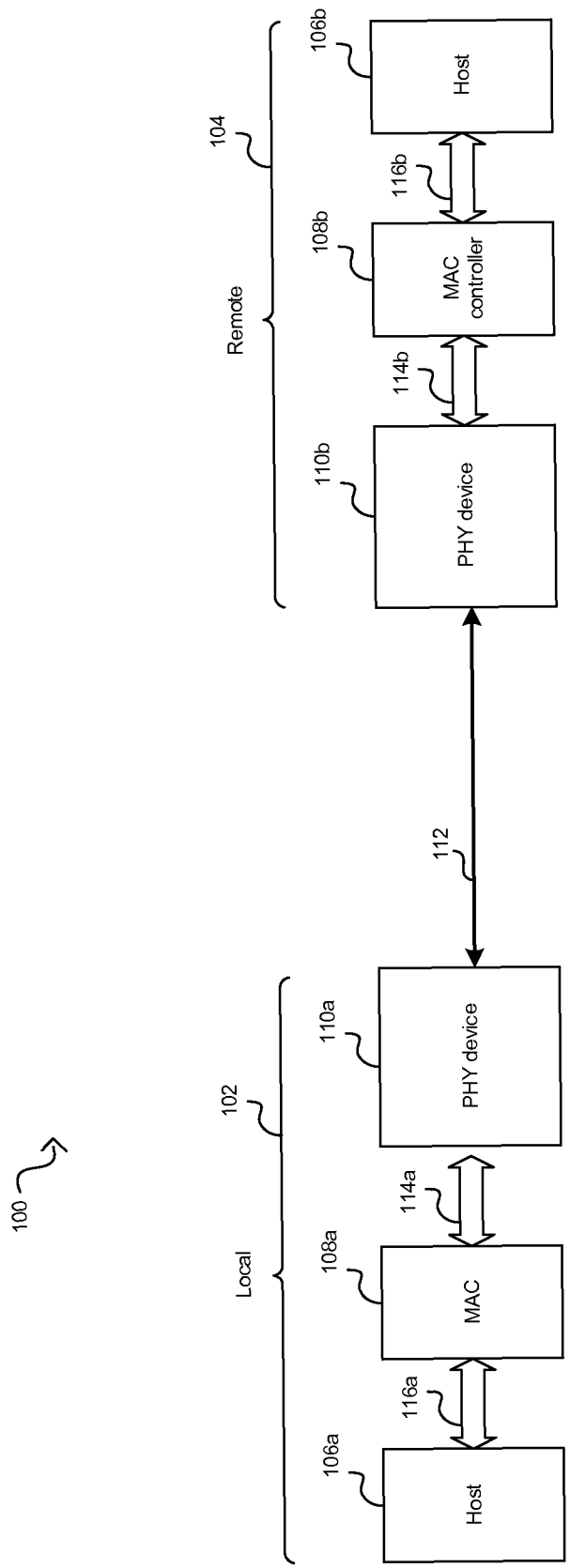
FIG. 1 is a block diagram illustrating an Ethernet connection between a local link partner and a remote link partner, in accordance with an embodiment of the invention.

Certain embodiments of the invention may be found in a method and system for a method and system for dynamically determining when to train Ethernet link partners to support energy efficient Ethernet networks. This may improve energy efficiency in Ethernet communication. In various embodiments of the invention, link partners may be communicatively coupled to an Ethernet link, the latter of which may comprise a plurality of channels. One or more of the channels may be active and/or one or more channels may be silent or set to a lower power. For example, the silent channels may have a data rate of zero. The Ethernet link partners may be enabled to support transitioning between lower power states and active channel states so as to provide energy efficient Ethernet communication. The Ethernet link partners may support symmetric or asymmetric data rates which may comprise a silent or zero data rate. The Ethernet link partners may dynamically determine when to perform training or refreshing of circuitry, timing loops and/or updating of one or more parameters for one or more of the plurality of the silent channels based on one or more control parameters and/or for example, a control program, control circuitry and/or a processor. Additionally, the Ethernet link partners may execute the training, refreshing and/or updating.

Default values may be utilized for the one or more control parameters, for example, when one or more determined control parameters is not available. Moreover, the one or more control parameters utilized to trigger the training, refreshing and/or updating may be based on results from one or more prior cycles of said training, refreshing and/or updating. For example, the one or more control parameters may be generated based on a magnitude of change or difference between one or more parameter values from one or more prior cycles and one or more subsequent cycles of the training, refreshing and/or updating. In some exemplary embodiments of the invention, the control parameters may be generated based on bit error rate measured during one or more prior cycles of channel activity for example. Moreover, the criteria for determining when to train, refresh and/or update parameters based on the control parameters, may be modified based on, for example, user input.

The training, refreshing and/or updating may sometimes occur at a regular frequency or at aperiodic intervals, for example. Moreover, the training, refreshing and/or updating may sometimes be triggered based on variable operating conditions such as type of cabling, length of cabling and/or environmental conditions. Environmental conditions may comprise, for example, temperature changes, echo and/or electromagnetic coupling such as near end cross talk (NEXT), alien NEXT (ANEXT), far end cross talk (FEXT) and/or alien FEXT (AFEXT). In this regard, alien cross talk may be received from channels outside of the medium used by two link partners. For example, in the case of 10GBASE-T adjacent cabling may introduce ANEXT and/or AFEXT.

The training may adapt a link partner to current link conditions such that reliable communications may be established on a link. For example, training may comprise configuring various parameters, circuitry, and/or timing loops in one or both of the nodes 102 and 104 such that the nodes 102 and 104 may be synchronized and/or reliably communicate over one or more physical channels of the cable 112. In this manner, the training may ensure reliable operation of functions such as echo cancellation, far-end crosstalk cancellation, and near-end crosstalk cancellation may be performed. Moreover, the training, refreshing and/or updating may occur for an echo canceller, a FEXT canceller, an AFEXT canceller, a NEXT canceller and/or an ANEXT canceller for any of the silent channels. Subsequent to the training and/or updating, the one or more silent channels may be activated and/or may remain silent. In this manner, the cost in terms of energy for Ethernet communication may be diminished with a reduction of duty cycle and/or frequency of training, refreshing and/or updating.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 may communicate via a cable 112. In an exemplary embodiment of the invention, the cable 112 may comprise up to four or more channels, each of which may, for example, comprise an unshielded twisted pair (UTP). The local link partner 102 and the remote link partner 104 may communicate via two or more channels comprising the cable 112. For example, Ethernet over twisted pair standards 10Base-T and 100Base-TX may utilize two pairs of UTP while Ethernet over twisted pair standards 1000Base-T and 10GBase-T may utilize four pairs of UTP.

In an exemplary embodiment of the invention, the link partners 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the link partners 102 and/or 104 may comprise a backplane PHY capable of operating at one or more standard rates such as 1000BASE-KX, 10GBASE-KX4 and/or 10GBASE-KR or; potentially standardized rates such as 40 Gbps and 100 Gbps and/or non-standard rates such as 2.5 Gbps and 5 Gbps.

In an exemplary embodiment of the invention, the link partners 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (NV) enabled equipment. In this regard, NV equipment may, for example, comprise, a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet operations. The PHY devices 110a and 110b may enable communications, such as 10 Mbps, 100 Mbps, 1000 Mbps (or 1 Gbps), 2.5 Gbps, 4 Gbps, 5 Gbps, 10 Gbps or 40 Gbps or 100 Gbps for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high(er) data rate in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates. In addition, a change in rate such as stepping up in rate or stepping down in rate may occur asymmetrically among the PHY devices 110a and/or 110b which may support energy efficient Ethernet. For example, the PHY device 110a may change its rate based on a change of rate in 110b, however, the PHY device 110a may change to a different rate than the PHY device 110b. Moreover, the PHY devices 110a and 110b may change rates independent of each other, for example, one PHY may change rate while the other does not change rate. Moreover, in some embodiments of the invention, one or more of the PHY devices may step down to a rate of zero.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE symbols that may be communicated between frames of data, during inter frame gap (IFG)).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

In various embodiments of the invention, the PHY devices 110a and 110b may comprise suitable logic, circuitry, and/or code that may enable dynamically determining when to train Ethernet link partners to support energy efficient Ethernet. For example, the PHY devices 110a and 110b may determine when to train or refresh circuits, timing loops and/or update the link partners 102 and/or 104 based on one or more control parameters and may execute the training, refreshing and/or updating.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of channels which may result in network links being underutilized for significant portions of time. When the link partners 102 and 104 first establish a connection, they may exchange some preliminary information and/or training signals. In this regard, the link partners 102 and 104 may negotiate a data rate (e.g., 10 Gbps) and duplex mode (e.g., full-duplex) for communicating with each other. Additionally, in order to establish reliable communications, each of the link partners 102 and 104 may need to adjust various parameters, timing loops and/or circuitry to account for variables such as the type of cabling over which data is communicated and environmental conditions (e.g. temperature) surrounding the cabling.

Training may adapt an Ethernet channel to current conditions such that functions such as echo cancellation, far-end crosstalk cancellation, and near-end crosstalk cancellation may be performed.

Link partners may train or refresh circuits, timing loops and/or parameters according to a control program, control circuitry and/or a processor at times that may be dynamically modified based on control parameters. For example, channels which have been inactive for a period of time may be retrained or refreshed such that corresponding circuitry, timing loops and/or parameters, which may become outdated over time, enable reliable data communications over the channel(s). The PHY devices 110a and 110b may dynamically determine when to train Ethernet link partners to support energy efficient Ethernet. For example, the PHY devices 110a and 110b may utilize one or more control parameters to determine when to train, refresh and/or update the link partners 102 and/or 104 and may execute the training, refreshing and/or updating. Full training steps for a channel that has been silent or inactive may take up to the order of 100 ms or up to the order of seconds. In accordance with various embodiments of the invention, this time may be reduced significantly since the silent or inactive channels may be refreshed and may not need to go through a full training cycle.

Figure 2:
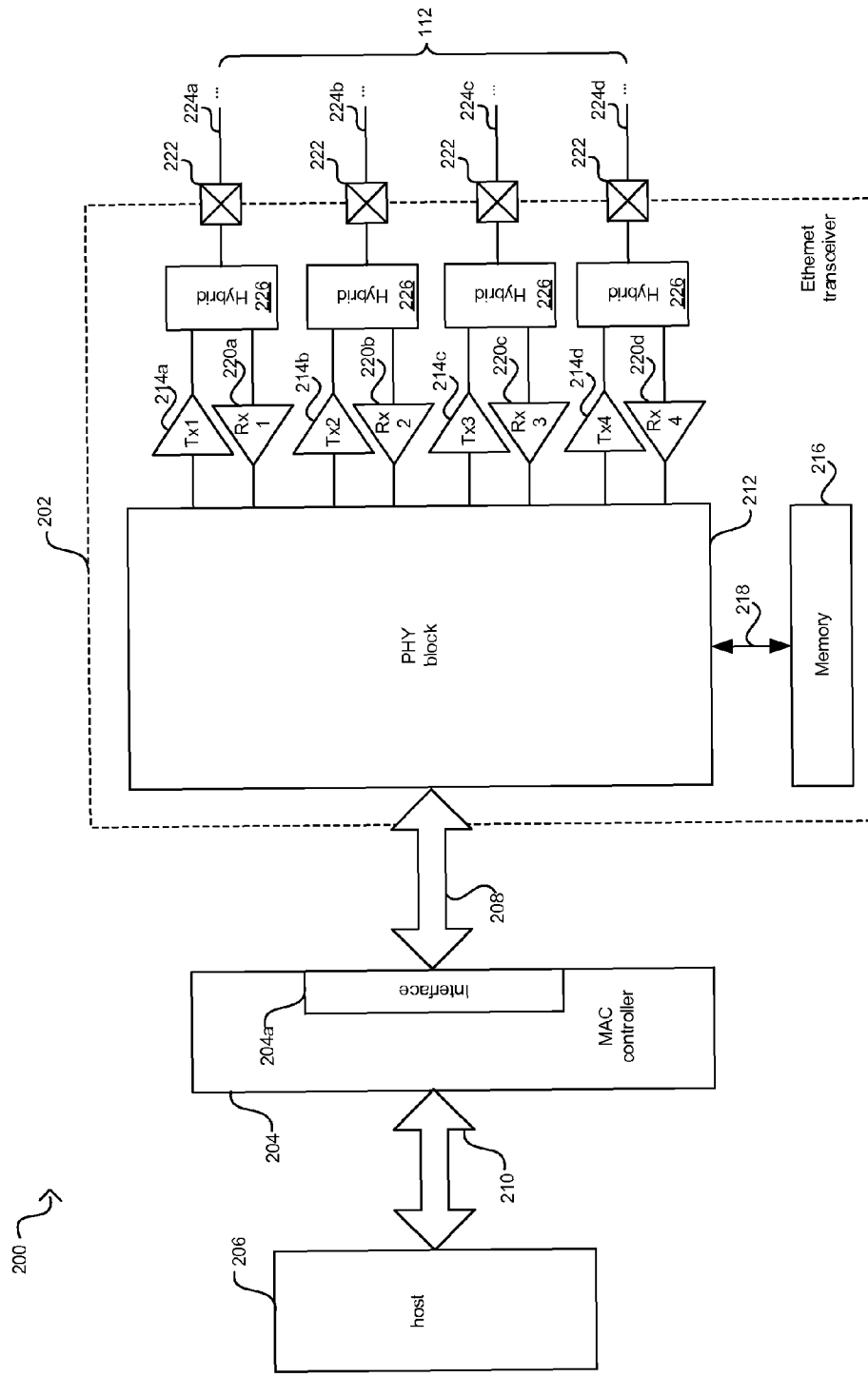
FIG. 2 is a block diagram illustrating an exemplary Ethernet over twisted pair PHY device architecture comprising a physical block, in accordance with an embodiment of the invention.

FIG. 2 is a block diagram illustrating an exemplary Ethernet over twisted pair PHY device architecture, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a physical layer block 212, one or more transmitters 214, one or more receivers 220, a memory 216, a memory interface 218, one or more input/output interfaces 222 and channels 224.

The PHY device 202 may be an integrated device that may comprise a physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise an interface 204a that may comprise suitable logic, circuitry, and/or code to enable communication with the PHY device 202 via the interface 208.

The physical layer block 212 in the PHY device 202 may comprise suitable logic, circuitry, and/or code that may enable operability and/or functionality of physical layer requirements. In this regard, the physical layer block 212 may enable generating the appropriate link discovery signaling utilized for establishing communication with a remote PHY device in a remote link partner. The physical layer block 212 may communicate with the MAC controller 204 via the interface 208. In one aspect of the invention, the interface 208 may be a media independent interface (MII) and may be configured to utilize a plurality of serial data lanes for receiving data from the physical layer block 212 and/or for transmitting data to the physical layer block 212. The physical layer block 212 may be configured to operate in one or more of a plurality of communication modes, where each communication mode may implement a different communication protocol. These communication modes may include, but are not limited to, Ethernet over twisted pair standards 10Base-T, 100Base-TX, 1000Base-T, 10GBase-T, and other similar protocols. The physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the physical layer block 212. The parameters may comprise configuration data and the code may comprise operational code such as software and/or firmware, but the information need not be limited in this regard. Moreover, the parameters may include adaptive filter and/or block coefficients for use by the physical layer block 212, for example. In various embodiments of the invention, the memory 216 and/or a control subsystem that may reside in the PHY 212 and have interaction with the host 106, may comprise control parameters that may enable triggering of, for example, link partner training and/or refreshing of circuitry, timing loops and/or parameters.

Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a channel that may comprise the cable 112. In this manner, a transmitter/receiver pair may interface with each of the channels 224a, 224b, 224c, 224d.

The input/output interfaces 222 may comprise suitable logic circuitry, and/or code that may enable the PHY device 202 to impress signal information onto a physical medium comprising a channel, for example a twisted pair channel comprising the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium comprising the channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the link partner 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, alien FEXT cancellers, near-end crosstalk (NEXT) cancellers and/or alien NEXT cancellers. Each hybrid 226 in the local link partner 300 may be communicatively coupled to an input/output interface 222.

Due to the complex nature of the signal processing involved with for example, duplex, simplex and/or asymmetric communication that may comprise high data rates, various components of the link partner 200 may be "trained" in order to provide reliable communications with a remote link partner. For example, the echo cancellers, FEXT cancellers, AFEXT cancellers, NEXT cancellers and/or ANEXT cancellers may comprise one or more configuration parameters which may be determined based exemplary factors comprising environmental conditions, distance to the remote link partner, and data rate. Accordingly, these configuration parameters may need to be configured upon establishing a connection to a remote link partner. Moreover, these parameters may need to be periodically refreshed due to, for example, environmental changes.

For example, environmental conditions may comprise temperature changes and/or electromagnetic coupling such as noise received from far-end and/or near-end neighboring cabling known as FEXT, AFEXT, NEXT and/or ANEXT. In the event that one or more links 224 may be inactive for some amount of time, environmental conditions may change and training coefficients and/or parameters may need to be updated prior to activating data traffic on the link. Proper training or refreshing of link partners and/or updating of parameters may improve a plurality of problems, for example, bit error rate, packet drops, time to activate a link from a silent state, buffer overflows and/or link drop. Accordingly, the PHY device 202 may dynamically determine when to train the Ethernet link partner 200 to support energy efficient Ethernet. For example, the PHY device 202 may utilize one or more control parameters to determine when to train the link partner 200, refresh link partner 202 circuitry and/or timing loops, and/or update parameters and may execute the training, refreshing and/or updating accordingly.

Figure 3A:
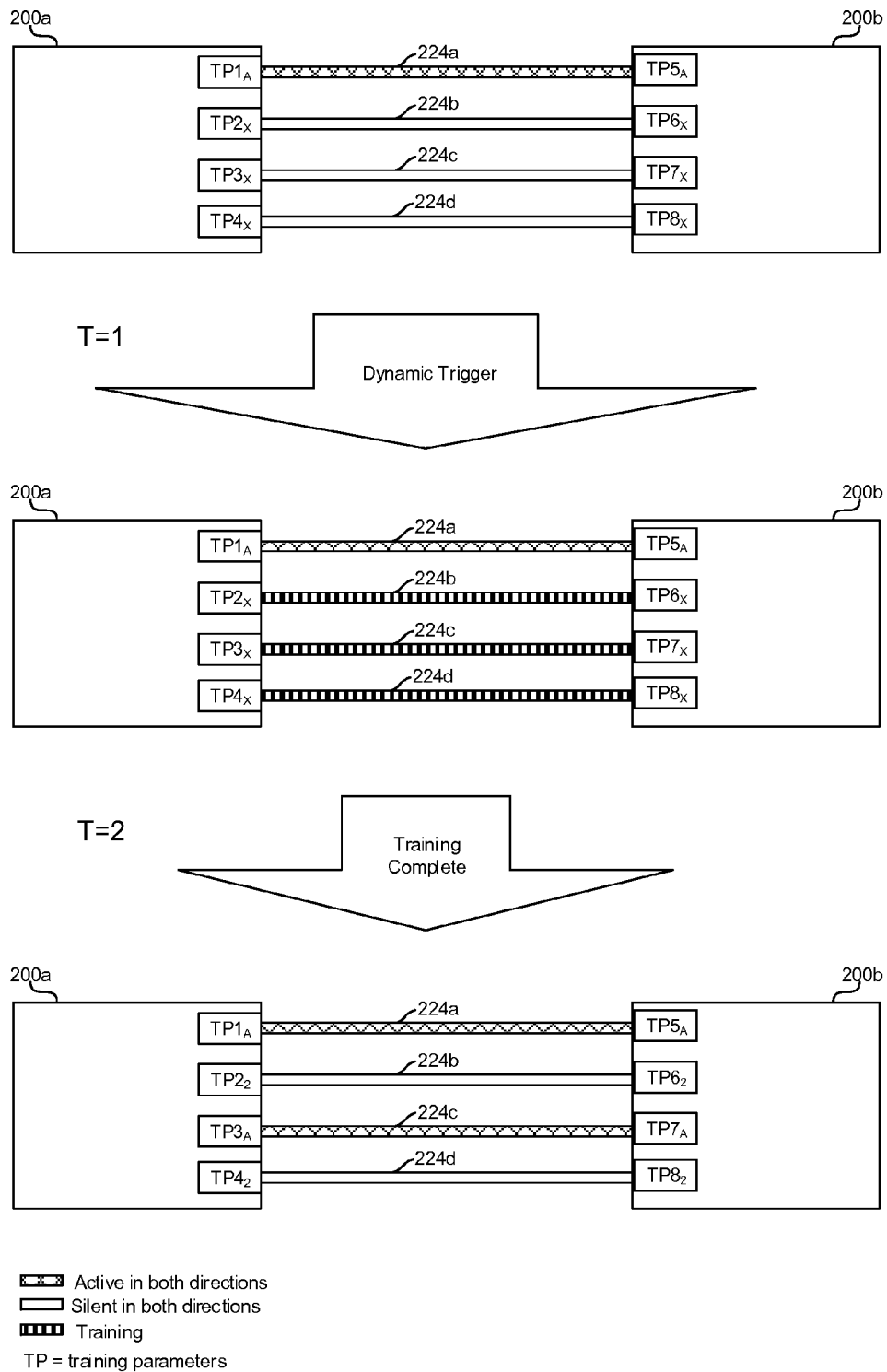
FIG. 3A is a diagram illustrating dynamic determination of when to train, refresh and/or update Ethernet link partners managing symmetric communication, in accordance with an embodiment of the invention.

FIG. 3A is a diagram illustrating dynamic determination of when to train, refresh and/or update Ethernet link partners managing symmetric communication, in accordance with an embodiment of the invention. Referring to FIG. 3A there is shown the link partners 200*a* and 200*b* which may communicate via one or more of the channels 224*a*, 224*b*, 224*c*, and 224*d*.

Each of the link partners 200*a* and 200*b* may comprise suitable logic, circuitry and/or code that may be enabled to dynamically determine when to train and/or refresh circuitry and/or timing loops and/or update parameters for one or more silent channels based on one or more control parameters. The link partners 200*a* and 200*b* may be communicatively coupled via the channels 224*a*, 224*b*, 224*c* and 224*d* and may be similar or substantially the same as link partner 200 described with respect to FIG. 2. In addition, the channels 224*a*, 224*b*, 224*c* and 224*d* may be similar to or substantially the same as the channels 224*a*, 224*b*, 224*c* and 224*d* described with respect to FIG. 2.

Various aspects of the invention may enable training or refreshing circuits and/or timing loops and/or updating parameters for one or more Ethernet channels which may be in a silent or low(er) power state. One or both of the link partners 200*a* and 200*b* may be enabled to dynamically determine when silent or lower power channels may benefit from refresh activity based on control parameters. Accordingly, the link partners 200*a* and/or 200*b* may be enabled to trigger training for one or more of the channels 224*a*, 224*b*, 224*c*, and 224*d* such that training parameters associated with the respective channel don't become so outdated that future communication via that channel may be compromised. For example, performance statistics such as bit error rate (BER) and/or dropped packets may be improved. The control parameters may be based on one or more environmental factors and/or operating conditions such as temperature, link latencies, error rates, echo and/or electromagnetic coupling such as cross talk or alien cross talk, for example. In various exemplary embodiments of the invention, the training, refreshing and/or updating activity may be triggered based on a threshold, a time interval and/or a frequency.

In various embodiments of the invention, a time or frequency for training or refreshing circuitry and/or parameters may be determined and/or adjusted based on one or more control parameters. In this regard, a control program and/or control circuitry may utilize control parameters to adjust an instant for initiation of or a frequency of training, refreshing and/or updating activity for the one or more silent channels. In various embodiments of the invention, information based on results observed after one or more prior cycles of training, refreshing and/or updating, may be fed back as one or more control parameters to modify the criteria for when to trigger the training, refreshing and/or updating activity. In this regard, a determination of when or at what frequency to execute the training, refreshing and/or updating may be based on a magnitude of change in one or more parameter values or performance measurements from one or more prior cycles to one or more subsequent cycles of training refreshing and/or updating activity. In addition, how often to repeat training, refreshing and/or updating activity may be determined based on frequency drift. In this regard, when operating with a poor quality crystal, refreshes may be triggered more often.

In an exemplary embodiment of the invention, in instances when one or more parameters for a silent channel has not significantly changed after a plurality of training, refreshing and/or updating cycles, the frequency of training, refreshing and/or updating may be diminished, In addition, default values may be utilized for control parameters instead of the feedback information, for example, prior to generating the feedback information. In another exemplary embodiment of the invention, packet error rates and/or bit error rates measured during one or more cycles of channel activity may be utilized for feedback or control parameter information. Subsequent to the training, refreshing and/or updating cycle for a silent channel, the silent channel may transition from a silent state to an active state, for example, at an intermediate rate or full rate or may return to a low(er) power and/or silent state.

In some embodiments of the invention, link partners may train, refresh and/or update parameters for one or more silent channels at the same time or at different times. Training of link partners for a silent channel may comprise, for example, transmission of a pulse or a depleted low density parity check code (LDPC) frame via the silent channel for example. Moreover, for one or more of the active channels, link partners 200*a* and/or 200*b* may comprise silent or low(er) power components. In this regard, the silent or low(er) power components of active channels may train, refresh and/or update parameters according to the algorithm.

Referring to FIG. 3A, prior to time instant T=1, the channel 224*a* may be active in both directions and thus training parameters TP1 and/or TP5 may be actively updating as a result of traffic being communicated over it. However, channels 224*b*, 224*c*, and 224*d* may be inactive in both directions and thus there may be no traffic communicated over channels 224*b*, 224*c*, and 224*d* to keep the training parameters TP2, TP3, TP4, TP6, TP7 and TP8 updated. Accordingly, the link partners 200*a* and/or 200*b* may determine when training, refreshing and/or updating activity may be executed for one or more of low(er) power and/or silent channels according to control parameters and or feedback information.

At time instant t=1 the link partner 200*a* may determine that the channels 224*b*, 224*c*, 224*d* may need to be refreshed for example. In this manner, refreshing activity may take place from time instant T=1 until time instant T=2. In an exemplary embodiment of the invention, upon completion of training, the channel 224*c* may transition from silent to active in both directions. On the other hand, the channels 224*b* and 224*d* may return to a low(er) power or silent state in both directions, but with their respective training parameters, TP2, TP4, TP6 and TP8, updated as of time instant T=2.

Figure 3B:
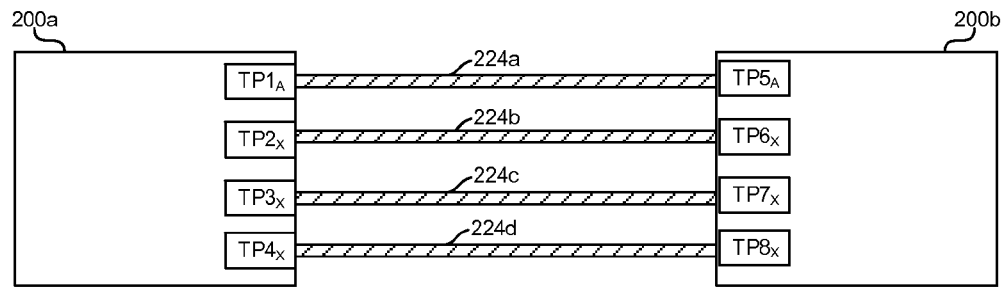
FIG. 3B is a diagram illustrating dynamic determination of when to train, refresh and/or update Ethernet link partners managing asymmetric communication, in accordance with an embodiment of the invention.
Figure 3B:
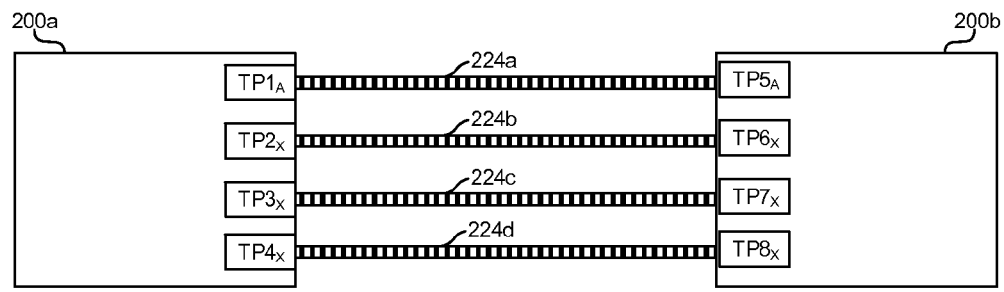
Figure 3B:
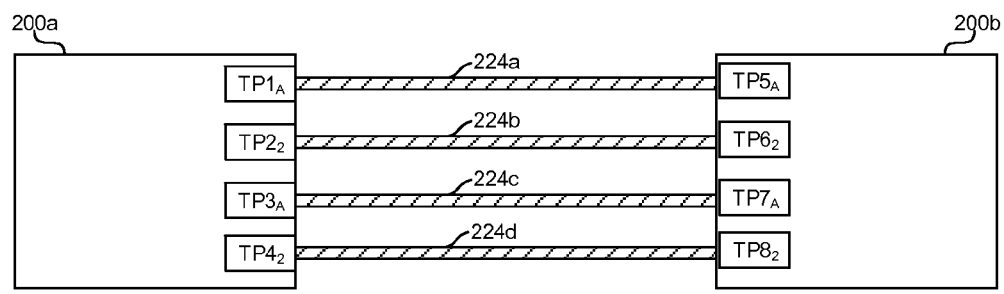

FIG. 3B is a diagram illustrating dynamic determination of when to train, refresh and/or update Ethernet link partners managing asymmetric communication, in accordance with an embodiment of the invention. Referring to FIG. 3B there is shown the link partners 200*a* and 200*b* which may communicate via one or more of the channels 224*a*, 224*b*, 224*c*, and 224*d*.

Referring to FIG. 3B, prior to time instant T=1, the channels 224*a*, 224*b*, 224*c* and/or 224*d* may be active in a first direction and silent in a second direction. Therefore, training parameters TP1 through TP8 associated with communication in the first direction may be dynamically or actively updated as a result of traffic communicated in the first direction. However, channels 224*a*, 224*b*, 224*c*, and 224*d* may be inactive or silent in the second direction and thus there may be no traffic communicated in the second direction over channels 224*a*, 224*b*, 224*c*, and 224*d* to keep the training parameters TP1 through TP8 that are associated only with communication in the second direction, updated. Accordingly, the link partners 200a and/or 200b may determine when training, refreshing and/or updating activity may be executed for the silent, second direction according to control parameters and or feedback information based on activity in the first direction. For example, in instances where variations in parameters associated with the first direction exceed specified thresholds, the training, refreshing and/or updating may be triggered for the second direction. Various other triggers, such as scheduled refreshing may also be utilized.

At time instant t=1 the link partner 200b may determine that the channels 224a, 224b, 224c, 224d may need to be refreshed for training parameters TP1 through TP8 that are associated with the second direction, for example. In this manner, refreshing activity may take place from time instant T=1 until time instant T=2. Notwithstanding, the channels 224a, 224b, 224c and/or 224d may remain in their active state in the first direction. In an exemplary embodiment of the invention, upon completion of training, the channels 224a, 224b, 224c and/or 224d in the second direction may transition from a training period to a silent or low(er) power state with their associated training parameters, TP1 through TP8, updated as of time instant T=2. The same channels 224a, 224b, 224c and 224d may remain active in the first direction.

Figure 4:
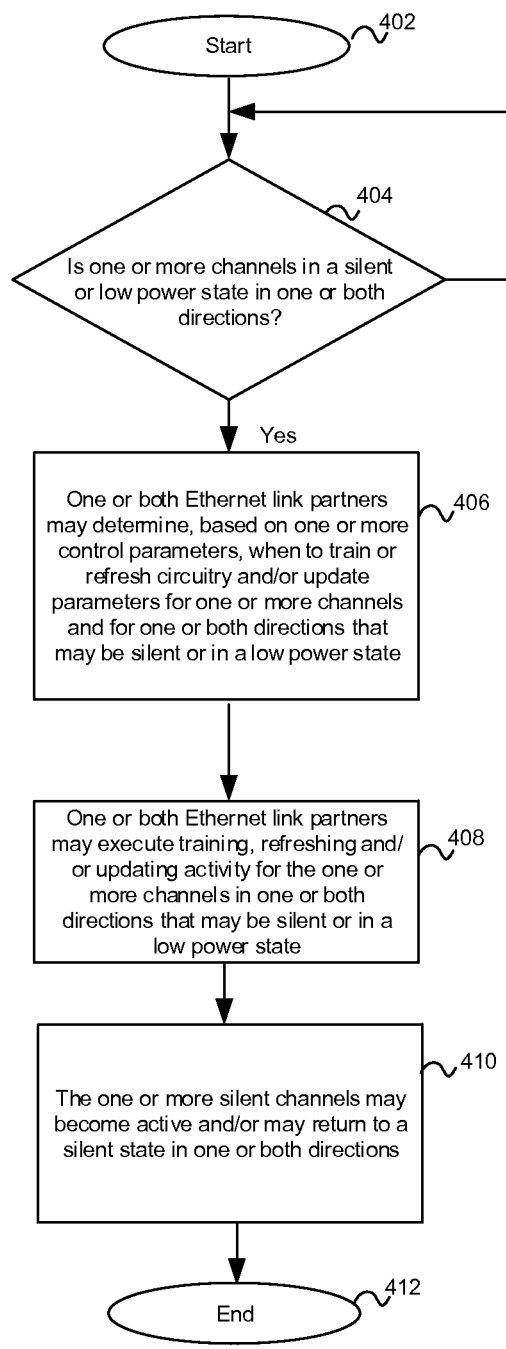
FIG. 4 is a flow chart illustrating exemplary steps for dynamic determination of when to train, refresh and/or update Ethernet link partners managing asymmetric communication, in accordance with an embodiment of the invention.

FIG. 4 is a flow chart illustrating exemplary steps for dynamic determination of when to train, refresh and/or update Ethernet link partners, in accordance with an embodiment of the invention. Referring to FIG. 4, after start step 402, in step 404, for one or both link partners 200a and 200b, in instances where one or more channels 224, in one or both directions are in a silent or low power state, proceed to step 406. In step 406, one or both of the Ethernet link partners 200a and/or 200b may determine, based on one or more control parameters, when to train or refresh circuitry and/or update parameters for one or more channels 224 and for one or both directions that may be silent or in a low power state. In step 408, one or both Ethernet link partners 200a and/or 200b may execute training, refreshing and/or updating activity for the one or more channels 224 in one or both directions that may be silent or in a low power state. In step 410, the one or more silent and/or low power channels 224 may become active and/or may return to a silent state in one or both directions. Step 412 may be the end of exemplary steps. In step 404, in instances where one or more channels 224, in one or both directions are not in a silent or low power state, proceed to step 404.

In various exemplary embodiments of the invention, determining when one or both link partners may train or refresh circuitry and/or update parameters that serve one or more silent channels and/or serve a channel that may be silent in one direction, may be based on one or more conditions and/or control parameters. In this regard, when to train, refresh and/or update with regard to a silent channel or a silent direction of a channel may be determined based on changes in other parameters. For example, Ethernet link partners that may have one or more channels in a silent state or that may have channels active in one direction and silent in an opposite direction, may monitor variations in parameter settings associated with the active channels and/or active direction of the channel. The monitoring may be done for a neighboring active link or of a same link in an opposite direction. For example, coefficients may be monitored.

The Ethernet link partner(s) may determine when to train or refresh circuitry and/or update parameters with regard to silent channels and/or with regard to silent directions of channels based on specified variations in parameters settings which may be observed with regard to the active channels or active directions of channels. For example, when a difference in value between an old parameter setting and a new parameter setting exceeds a threshold with regard to an active channel, then training, refreshing and/or updating may be triggered for a silent channel and/or for link partner components serving the direction of a channel which is silent.

In accordance with an embodiment of the invention, the frequency at which link partner components serving an active channel and/or an active direction of a channel are trained, refreshed and/or updated may be utilized to determine the frequency at which link partner components serving a silent channel or silent direction on a channel are updated. Furthermore, results in performance observed with regard to one or more channels or in one or more directions, for example, based on performance statistics and/or control parameters, may help determine when and/or how often to perform training, refreshing and/or updating with regard to silent channels and/or silent directions of channels. For example, in instances where a specified threshold is exceeded for BER with regard to an active channel and/or an active direction of a channel, training, refreshing and/or updating may be triggered for a silent channel and/or silent direction of a channel. In addition, training, refreshing and/or updating may occur according to a determined schedule or based on a known condition. For example, if it is known that a clock has a high level of frequency drift, training, refreshing and/or updating may be performed more often.

In an embodiment of the invention, the link partners 200a and/or 200b that may be communicatively coupled via an Ethernet link 112 may determine when to perform training activity, refresh circuits and/or perform updating activity based on one or more control parameters. The Ethernet link 112 that may comprise one or more silent channels such as channels 224a, 224b, 224c and/or 224d. In addition, the link partners 200a and/or 200b may execute one or more of the training, refreshing and/or updating at the determined time and/or frequency. One or more of the control parameters may comprise a default value and may be determined based on prior training, refreshing and/or updating for the one or more of the silent channels 224a, 224b, 224c and/or 224d.

New values for the one or more control parameters may be generated based on a magnitude of change between values of one or more current control parameters and values of one or more prior control parameters. Moreover, new values for the one or more control parameters may be generated based on bit error rate, which may be measured during one or more prior periods of traffic activity. In various embodiments of the invention, user input may be utilized to determine when to execute the training, refreshing and/or updating. The training, refreshing and/or updating may be done for one or more of a near-end crosstalk canceller, a far-end crosstalk canceller and an echo canceller. After the training, refreshing and/or updating, one or more of the silent channels 224a, 224b, 224c and/or 224d may transition to active and/or may remain silent.

In an Ethernet link that may communicatively couple one or more link partners 200a and 200b and may comprise a plurality of channels such as 224a, 224b, 224c and 224d. One or more of the channels 224a, 224b, 224c and 224d may be active and/or one or more channels may be silent or set to a lower power. For example, silent channels may have a data rate of zero. The Ethernet link partners 200a and/or 200b may determine when to perform training or refreshing of circuitry and/or updating of one or more parameters for one or more of the plurality of channels 224a, 224b, 224c and 224d based on a control program, control circuitry and/or processor for example, that may accept one or more control parameters as input. Additionally, the Ethernet link partners 200*a* and/or 200*b* may execute the training, refreshing and/or updating.

The training, refreshing and/or updating may occur at a regular frequency or at aperiodic intervals for example. Moreover, the training, refreshing and/or updating may be triggered based on variable operating conditions such as type of cabling and/or length of cabling or for environmental conditions. For example, environmental conditions may comprise temperature change, echo and/or electromagnetic coupling such as FEXT, AFEXT, NEXT and/or ANEXT. Default values may be utilized for algorithm variables, for example, when data for algorithm arguments is not available. Moreover, the control parameters may be based on results from one or more prior cycles of said training, refreshing and/or updating. For example, the one or more control parameters may be generated based on a magnitude of change or difference between one or more parameter values from one or more prior cycles and one or more subsequent cycles of the training, refreshing and/or updating.

In some exemplary embodiments of the invention, the one or more control parameters may be generated based on bit error rate measured during one or more prior cycles of channel activity for example. Moreover, the criteria for determining when to train, refresh and/or update control parameters, may be modified based on user input. The training, refreshing and/or updating may occur for an echo canceller, a far-end crosstalk canceller and a near-end crosstalk canceller for any of the silent channels 224*a*, 224*b*, 224*c* and/or 224*d*. Subsequent to the training, refreshing and/or updating, the one or more silent channels 224*a*, 224*b*, 224*c* and/or 224*d* may be activated and/or may remain silent.

Another embodiment of the invention may provide a machine-readable storage, having stored thereon, a computer program having at least one code section executable by a machine, thereby causing the machine to perform the steps as described herein for a method and system for dynamically determining when to train Ethernet link partners to support energy efficient Ethernet networks.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a first physical layer device that is coupled via a communication link having a plurality of communication channels to a second physical layer device, wherein during a low power mode of the first physical layer device, a first subset of the plurality of communication channels is in an active state that enables communication at a first transmission rate and a second subset of the plurality of communication channels is in a low power state that enables communication at a second transmission rate lower than the first transmission rate:
prior to a decision to transition at least one of the second subset of the plurality of communication channels from the low power state to the active state, determining, based on an analysis of one or more control parameters based on a communication performance measured on at least one of the first subset of the plurality of communication channels in the active state, when to cause a triggering of training of parameters of operation of one or more of a near-end crosstalk canceller, an alien near-end cross talk canceller, a far-end cross talk canceller, an alien far-end cross talk canceller and an echo canceller used by at least one of the second subset of the plurality of communication channels; and
executing the training of parameters of operation based on the determination.

2. The method of claim 1, wherein the determining comprises determining based on a frequency of prior training.

3. The method of claim 1, wherein the determining comprises determining based on changes during prior training.

4. The method of claim 1, wherein the determining comprises determining based on a bit error rate or a packet error rate.

5. The method of claim 1, wherein the determining comprises determining based on variations in parameters of the at least one of the first subset of the plurality of communication channels.

6. The method of claim 1, wherein the determining comprises determining based on an expected frequency drift of a clock.

7. A system, the system comprising:
one or more circuits in a first physical layer device that is coupled via a communication link having a plurality of communication channels to a second physical layer device, wherein during a low power mode of the first physical layer device, a first subset of the plurality of communication channels is in an active state that enables communication at a first transmission rate and a second subset of the plurality of communication channels is in a low power state that enables communication at a second transmission rate lower than the first transmission rate, the one or more circuits configured to:
determine, prior to a decision to transition at least one of the second subset of the plurality of communication channels from the low power state to the active state, based on an analysis of one or more control parameters based on a communication performance measured on at least one of the first subset of the plurality of communication channels in the active state, when to cause a triggering of training of parameters of operation of one or more of a near-end crosstalk canceller, an alien near-end cross talk canceller, a far-end cross talk canceller, an alien far-end cross talk canceller and an echo canceller used by at least one of the second subset of the plurality of communication channels; and execute the training of parameters of operation based on the determination.

8. The system of claim 7, wherein the one or more circuits are configured to determine based on a frequency of prior training.

9. The system of claim 7, wherein the one or more circuits are configured to determine based on changes during prior training.

10. The system of claim 7, wherein the one or more circuits are configured to determine based on a bit error rate or a packet error rate.

11. The system of claim 7, wherein the one or more circuits are configured to determine based on variations in parameters of the at least one of the first subset of the plurality of communication channels.

12. The system of claim 7, wherein the one or more circuits are configured to determine based on an expected frequency drift of a clock.

13. A non-transitory machine-readable storage having stored thereon, a computer program having at least one code section for energy efficient networking, the at least one code section executable by a machine for causing the machine to perform steps comprising:

in a first physical layer device that is coupled via a communication link having a plurality of communication channels to a second physical layer device, wherein during a low power mode of the first physical layer device, a first subset of the plurality of communication channels is in an active state that enables communication at a first transmission rate and a second subset of the plurality of communication channels is in a low power state that enables communication at a second transmission rate lower than the first transmission rate:

prior to a decision to transition at least one of the second subset of the plurality of communication channels from the low power state to the active state, determining, based on an analysis of one or more control parameters based on a communication performance measured on at least one of the first subset of the plurality of communication channels in the active state, when to cause a triggering of training of parameters of operation of one or more of a near-end crosstalk canceller, an alien near-end cross talk canceller, a far-end cross talk canceller, an alien far-end cross talk canceller and an echo canceller used by at least one of the second subset of the plurality of communication channels in the low power state; and execute the training of parameters of operation based on the determination.

14. The non-transitory machine-readable storage of claim 13, wherein the determining comprises determining based on a frequency of prior training.

15. The non-transitory machine-readable storage of claim 13, wherein the determining comprises determining based on changes during prior training.

16. The non-transitory machine-readable storage of claim 13, wherein the determining comprises determining based on a bit error rate or a packet error rate.

17. The non-transitory machine-readable storage of claim 13, wherein the determining comprises determining based on variations in parameters of the at least one of the first subset of the plurality of communication channels.

18. The non-transitory machine-readable storage of claim 13, wherein the determining comprises determining based on an expected frequency drift of a clock.

* * * * *